(12) United States Patent
Huber et al.

(10) Patent No.: US 12,459,191 B2
(45) Date of Patent: Nov. 4, 2025

(54) METHOD FOR SEPARATING A THERMOFORMING MODEL FROM A FILM

(71) Applicant: Dental Manufacturing Unit GmbH, Puch bei Hallein (AT)

(72) Inventors: Martin Huber, Pfarrwerfen (AT); Alfons Wörmer-Aigmüller, Bischofshofen (AT)

( * ) Notice: Subject to any disclaimer, the term of this patent is extended or adjusted under 35 U.S.C. 154(b) by 160 days.

(21) Appl. No.: 18/286,542

(22) PCT Filed: Feb. 14, 2022

(86) PCT No.: PCT/AT2022/060043
§ 371 (c)(1),
(2) Date: Oct. 11, 2023

(87) PCT Pub. No.: WO2022/217297
PCT Pub. Date: Oct. 20, 2022

(65) Prior Publication Data
US 2024/0375342 A1    Nov. 14, 2024

(30) Foreign Application Priority Data

Apr. 12, 2021   (AT) ................ A50268/2021

(51) Int. Cl.
*B29C 51/44* (2006.01)
*A61C 7/08* (2006.01)
(Continued)

(52) U.S. Cl.
CPC ............ *B29C 51/44* (2013.01); *A61C 7/08* (2013.01); *B29C 51/08* (2013.01); *B29C 51/261* (2013.01);
(Continued)

(58) Field of Classification Search
CPC ....... B29C 51/44; B29C 51/261; B29C 51/08; A61C 7/08; B29K 2105/256; B29L 2031/7536; B29L 2031/753
See application file for complete search history.

(56) References Cited

U.S. PATENT DOCUMENTS 7,261,533 B2    8/2007  Wrosz et al.
7,572,121 B2    8/2009  Wrosz et al.
(Continued)

FOREIGN PATENT DOCUMENTS

DE    202018102517 U1    6/2018
EP           1686913          8/2006
(Continued)

*Primary Examiner* — Monica A Huson
(74) *Attorney, Agent, or Firm* — Tiajoloff & Kelly LLP

(57) ABSTRACT

In a method for separating a dental deep drawing model (1) from a deep drawing film (2) without being damaged, despite high adhesion forces or interlocking fit and without the need to chemically or mechanically modify the components involved, at least one pulling means (3) that extends at least in sections between the deep drawing model (1) and the deep drawing film (2) and that comprises a stop (4) for a puller (5) is arranged on the deep drawing model (1). The deep drawing model (1) is positioned along with the deep drawing film (2) over a removal opening (7), the edge (9) of which forms a stop limit for the free deep drawing edge (10) of the deep drawing film (2), and then a movable puller (5) is brought into an engagement position, in which the puller (5) engages in the stop of the pulling means (3) and is moved beyond this engagement position into a removal position, in which the deep drawing model (1) is pulled out of the deep drawing film (2) through the removal opening (7).

20 Claims, 3 Drawing Sheets

Figure 1:
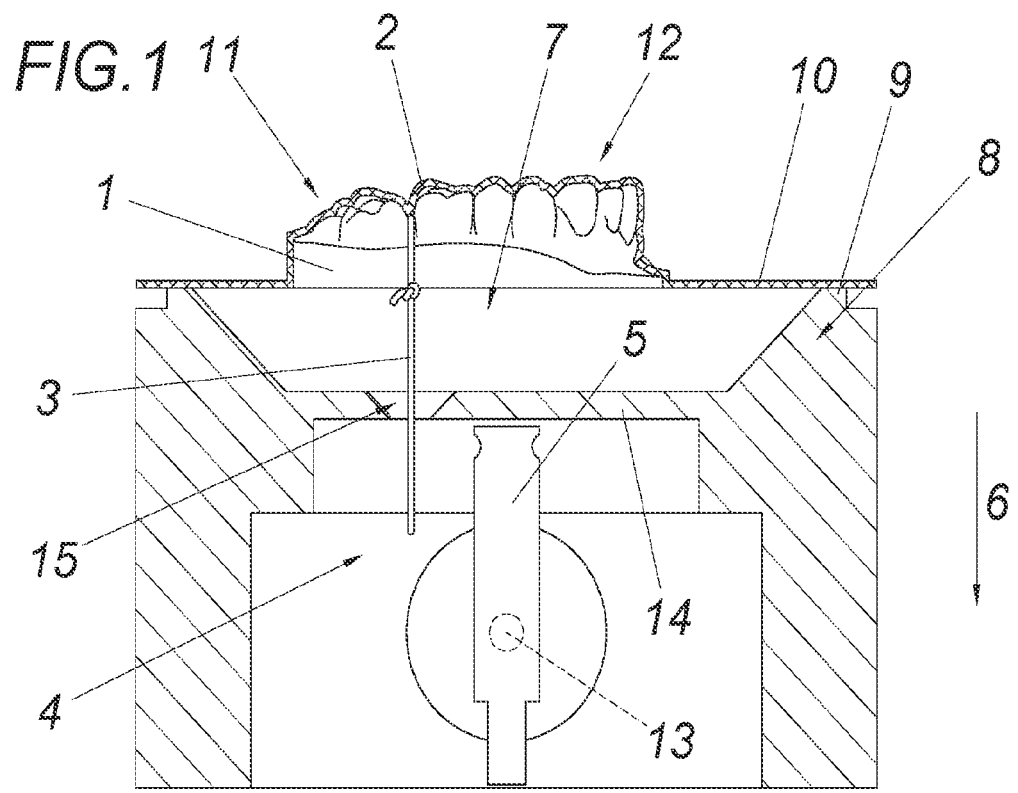

(51) Int. Cl.
  *B29C 51/08*  (2006.01)
  *B29C 51/26*  (2006.01)
  *B29K 105/00*  (2006.01)
  *B29L 31/00*  (2006.01)

(52) U.S. Cl.
  CPC ... *B29K 2105/256* (2013.01); *B29L 2031/753* (2013.01)

(56) References Cited

U.S. PATENT DOCUMENTS

| | | | |
|---|---|---|---|
| 9,943,386 | B2 | 4/2018 | Webber et al. |
| 10,357,336 | B2 | 7/2019 | Wen |
| 10,702,357 | B2 | 7/2020 | Webber et al. |
| 11,051,913 | B2 | 7/2021 | Wen |
| 11,420,362 | B2 | 8/2022 | Mojdeh et al. |
| 11,724,435 | B2 | 8/2023 | Stewart et al. |
| 2005/0082703 | A1 | 4/2005 | Wrosz |
| 2008/0292741 | A1 | 11/2008 | Wrosz et al. |
| 2015/0335404 | A1 | 11/2015 | Webber et al. |
| 2017/0100211 | A1 | 4/2017 | Wen |
| 2018/0200031 | A1 | 7/2018 | Webber et al. |
| 2019/0337199 | A1 | 11/2019 | Jo |
| 2019/0343602 | A1 | 11/2019 | Wen |
| 2020/0130237 | A1 | 4/2020 | Mojdeh et al. |
| 2020/0360117 | A1 | 11/2020 | Webber et al. |
| 2021/0282899 | A1 | 9/2021 | Wen |
| 2021/0323216 | A1 | 10/2021 | Stewart et al. |
| 2022/0410438 | A1 | 12/2022 | Mojdeh et al. |

FOREIGN PATENT DOCUMENTS

| | | |
|---|---|---|
| EP | 3544542 | 10/2019 |
| EP | 3549546 A1 | 10/2019 |
| WO | 2005/041804 A2 | 5/2005 |
| WO | 2018/118200 A1 | 6/2018 |
| WO | 2020/146800 A1 | 7/2020 |

METHOD FOR SEPARATING A THERMOFORMING MODEL FROM A FILM

FIELD OF THE INVENTION

The invention relates to a method for separating a dental deep drawing model from a deep drawing film.

DESCRIPTION OF THE PRIOR ART

It is known from the prior art to use dental splints for the correction of malocclusions. To produce such a dental splint, a deep drawing film is drawn over a three-dimensional dental deep drawing model representing the corrected patient's dentition. Since the patient's dentition must be reproduced as accurately as possible by the deep drawing model and the teeth, gums and jaws have complex surfaces, the production of the dental splint results in a very large interaction surface and sometimes even undercuts between the deep drawing film and the deep drawing model, which can result in strong adhesion or even an interlocking fit. This makes it very difficult to detach the drawn deep drawing film from the deep drawing model. Depending on the individual shape of the deep drawing model, this can even mean that the deep drawing film cannot be detached from the deep drawing model without damage. To solve this problem, it has already been proposed (EP1686913A4) to facilitate the separation process by using soap, silicone or Teflon. However, these aids must be removed again by chemical treatment before the dental splint can be used.

EP3544542A4 proposes to provide a channel running in the deep drawing direction in the deep drawing model. The dental splint made from the deep drawing film forms a tapered plug which is clamped in this channel. After deep drawing, this plug is pressed out of the channel with the aid of a tool, causing the dental splint to detach from the deep drawing model.

However, a disadvantage of the prior art is that both the deep drawing model and the deep drawing film must be modified in their nature in order to separate the two components from each other. Since the channel must extend through the deep drawing model, the dentition to be modeled cannot be precisely reproduced either, at least at this point. In addition, the plug must be cut after separation from the deep drawing film and the latter must be deburred. The biggest problem, however, is that the necessary forces can only be applied at one point, which tends to require higher separation forces. Depending on the individual shape of the deep drawing model, however, some dental splints cannot be separated at all, or not without damage, by applying the force at a standardized point.

SUMMARY OF THE INVENTION

The invention is thus based on the object of demonstrating a method with which a deep drawing film can be released from a dental deep drawing model without being damaged, despite the occurring high adhesion forces or the interlocking fit, without chemically modifying or mechanically processing the components involved.

The invention solves the set object in that at least one pulling means which extends at least in sections between the deep drawing model and the deep drawing film and which comprises a stop for a puller is arranged on the deep drawing model, in that the deep drawing model is positioned along with the deep drawing film over a removal opening, the edge of which forms a stop limit for the free deep drawing edge of the deep drawing film, and then a movable puller is brought into an engagement position, in which the puller engages in the stop of the pulling means and is moved beyond this engagement position into a removal position, in which the deep drawing model is pulled out of the deep drawing film through the removal opening. In the engagement position, the puller engages in the stop of the pulling means, but does not yet exert any force on the deep drawing model. Only during the displacement from the engagement position to the removal position is a pulling force exerted on the deep drawing model via the pulling means. The pulling force is directed in the pull-through direction transverse to the plane defined by the removal opening. The free deep drawing edge of the deep drawing film is the region which, in the engagement position, extends essentially parallel to the removal opening and does not form a contact surface with the deep drawing model. Since the diameter of the deep drawing film is larger than that of the deep drawing model due to the free deep drawing edge, the edge of the removal opening only forms a stop limit for the deep drawing film, but not for the deep drawing model. Thus, when the pulling force is applied to the deep drawing model, the deep drawing model is pulled out of the deep drawing film through the removal opening, with the deep drawing film resting unchanged on the stop limit. In a preferred embodiment, the pulling force causes a slight curvature of the deep drawing film in the tensile direction, so that a vertex facing the puller is formed at the point of application of the force. This facilitates separation, but does not cause the deep drawing film to enter the removal opening completely. As a pulling means, for example, an annular band extending partially between the deep drawing model and the deep drawing film can be placed around the deep drawing model, forming a hanging loop in which a hook can engage as a puller and apply the traction force to the deep drawing model. In a particularly preferred embodiment, the pulling means comprises at least one tape and a bearing platform, wherein the pulling force of the puller is applied via the bearing platform to the tape and from there to the deep drawing model.

In order to arrange the pulling means easily and reversibly between the deep drawing model and the deep drawing film, it is proposed that at least one section of the pulling means is arranged on the dental deep drawing model before the deep drawing of the deep drawing. In this way, the deep drawing model can first be provided with the pulling means and then the deep drawing film can be drawn over it. This not only enables simple arrangement of the pulling means, but also attaches the pulling means to the deep drawing model in an equally stable and reversible manner and enables simple release after separation.

The force required for separation can be reduced by arranging at least one section of the pulling means in the region of the two end sections of the deep drawing model. Since the deep drawing model is essentially U-shaped, the deep drawing model forms two legs which extend essentially from the jaw teeth to the canine teeth of the deep drawing model. If the pulling means is arranged in the region of the two end sections, i.e. in the region of the rear molars, these legs act as a lever with a fulcrum located in the region of the incisors when a traction force is exerted in the direction of traction. The deep drawing model therefore performs a rotational movement under the influence of the pulling force, which facilitates the release of the deep drawing model from the deep drawing film.

If the pulling means is arranged between the deep drawing film and the deep drawing model, this can influence the shape of the deep drawing film, since the deep drawing film follows the contour of the pulling means during deep drawing. This causes the actual shape of the formed dental splint to deviate from the nominal shape. However, the influence of the pulling means on the shape of the deep drawing film can be minimized if at least one section of the pulling means is arranged between two teeth of the deep drawing model. In this way, the naturally occurring interdental spaces or depressions between the teeth can be used to arrange the pulling means there, so that the pulling means does not produce any undesirable contours. In this way, elevations that impair the wearing comfort or functionality of the dental splint made from the deep drawing film are avoided or minimized depending on the tooth shape and position.

A further measure to minimize the influence of the pulling means on the shape of the dental splint produced from the deep drawing film is that the pulling means comprises a tape which is dimensionally unstable in terms of its cross-section. The dimensional instability is selected so that the pulling means has the smallest possible cross-sectional area between the deep drawing pattern and the deep drawing film, can be arranged as flat as possible between the deep drawing model and the deep drawing film, and therefore has the smallest possible influence on the contour of the dental splint. The dimensionally unstable tape can be a Kevlar tape, for example. In a preferred embodiment, the pulling means is reusable.

The invention also relates to a device for separating a dental deep drawing model from a deep drawing film, characterized by a separation platform which has a removal opening, the edge of which forms a stop limit for the free deep drawing edge of the deep drawing film, and has a puller, arranged on the side of the separation platform facing away from the stop limit and displaceable from an engagement position into a removal position, for engagement in a stop formed by a pulling means arranged on the deep drawing model. The separation platform can be, for example, a metal or hard plastic plate with a recess serving as a removal opening. In this case, the diameter of the removal opening must be larger than the largest width of the deep drawing model, but smaller than the largest diameter of the deep drawing film, so that the edge of the removal opening forms the stop limit for the free deep drawing edge. The puller is arranged on the side of the separation platform facing away from the stop limit and moves away from the removal opening in the pull-through direction when it is moved from the engagement position to the removal position. After separation, the deep drawing film resting on the separation platform can be removed and the deep drawing model removed from the removal opening.

The puller can be more easily displaced to the engagement position and from there more easily to the removal position if the puller is mounted on an axis of rotation parallel to a plane defined by the removal opening. As a result of these measures, the puller performs a rotary movement when it is displaced, wherein the axis of rotation can be located inside or outside the puller, the movement of which can be broken down into a horizontal component parallel to the separation platform and a vertical component orthogonal to the separation platform. If the puller is suitably dimensioned, the horizontal component makes it easier to engage the puller with the stop in the engagement position without having to move the deep drawing model together with the deep drawing film on the separation platform. Once the engagement position has been reached, the removal position can be reached by simply moving the puller further, as the vertical component of the puller's rotational movement allows the pulling force required for separation to be applied.

The separation force to be applied can be reduced despite the high adhesion if the edge of the removal opening is frustoconical on the stop limit side. The edge of the removal opening forms a stop limit only on the surface on which the deep drawing film rests. The peripheral surface of the truncated cone forms a free space between the deep drawing film and the separating platform, the height of which increases towards the center of the removal opening. If the puller applies the pulling force to the deep drawing model via the stop, the deep drawing film is pulled into the free space in the tensile direction due to the acting adhesion, which causes elastic expansion of the deep drawing film and thus easier separation.

To make it easier to apply the traction force required for cutting manually, the puller can be attached to a lever that can be moved about the axis of rotation. Particularly user-friendly operating conditions result if the lever is mounted on the axis of rotation via an elongated hole extending parallel to the longitudinal axis of the lever, as this facilitates engagement of the puller in the stop formed by the pulling means.

To ensure that the deep drawing model can be easily removed from the device after separation, it is proposed that the removal opening forms a receptacle for a bearing platform located downstream of the puller in the pulling direction, the platform having at least one aperture as a passage opening for a tape. In the engaged position, the tape projects through the bearing platform accommodated by the removal opening. If the deep drawing model is released from the deep drawing film when it is moved from the engagement position to the removal position, it is located on the bearing platform and can be removed from there via the removal opening after removal of the deep drawing film. The bearing platform can be made of metal or plastic, for example.

BRIEF DESCRIPTION OF THE INVENTION

Figure 2:
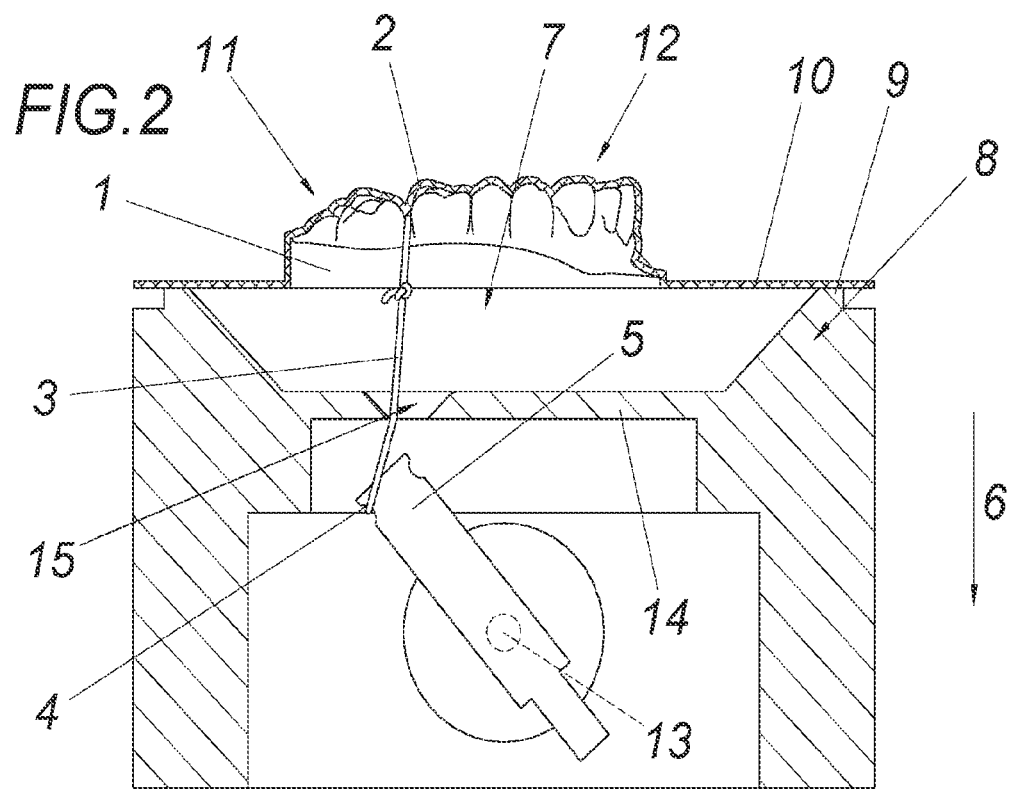
Figure 3:
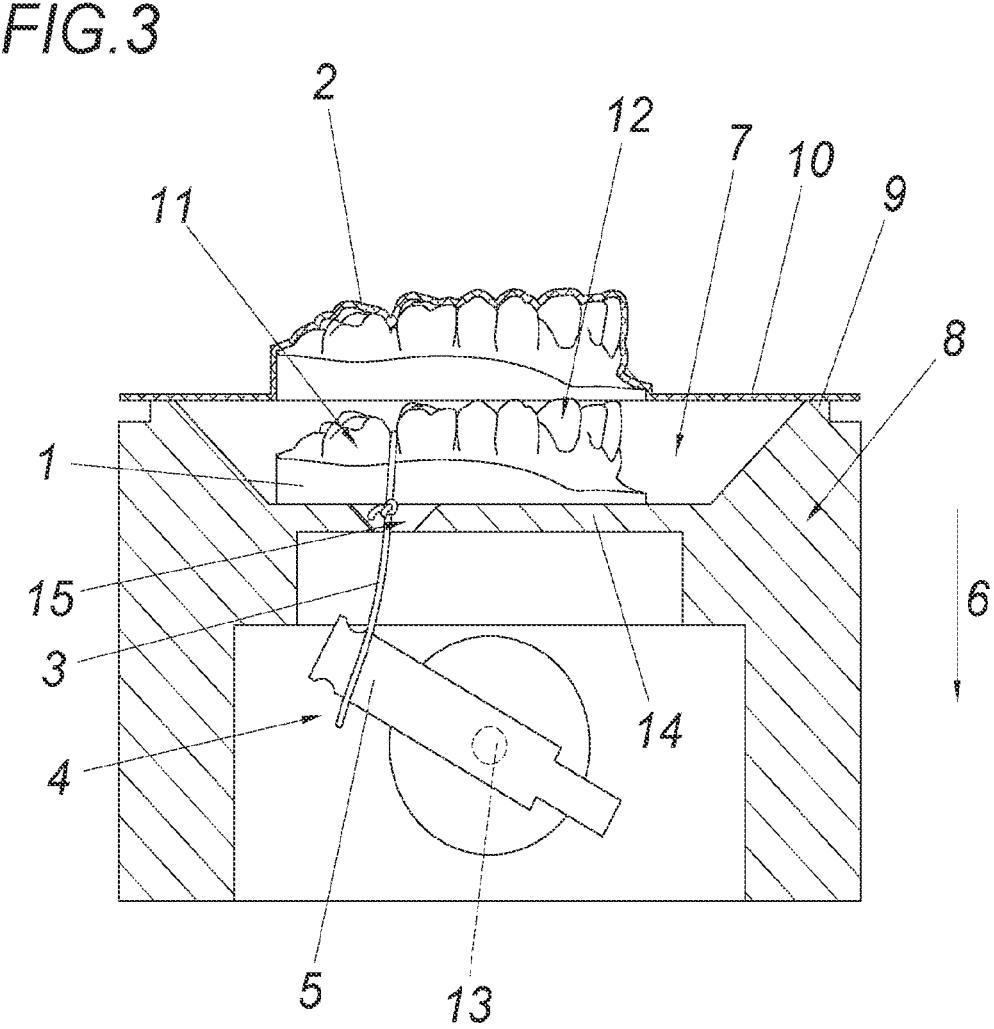
Figure 4:
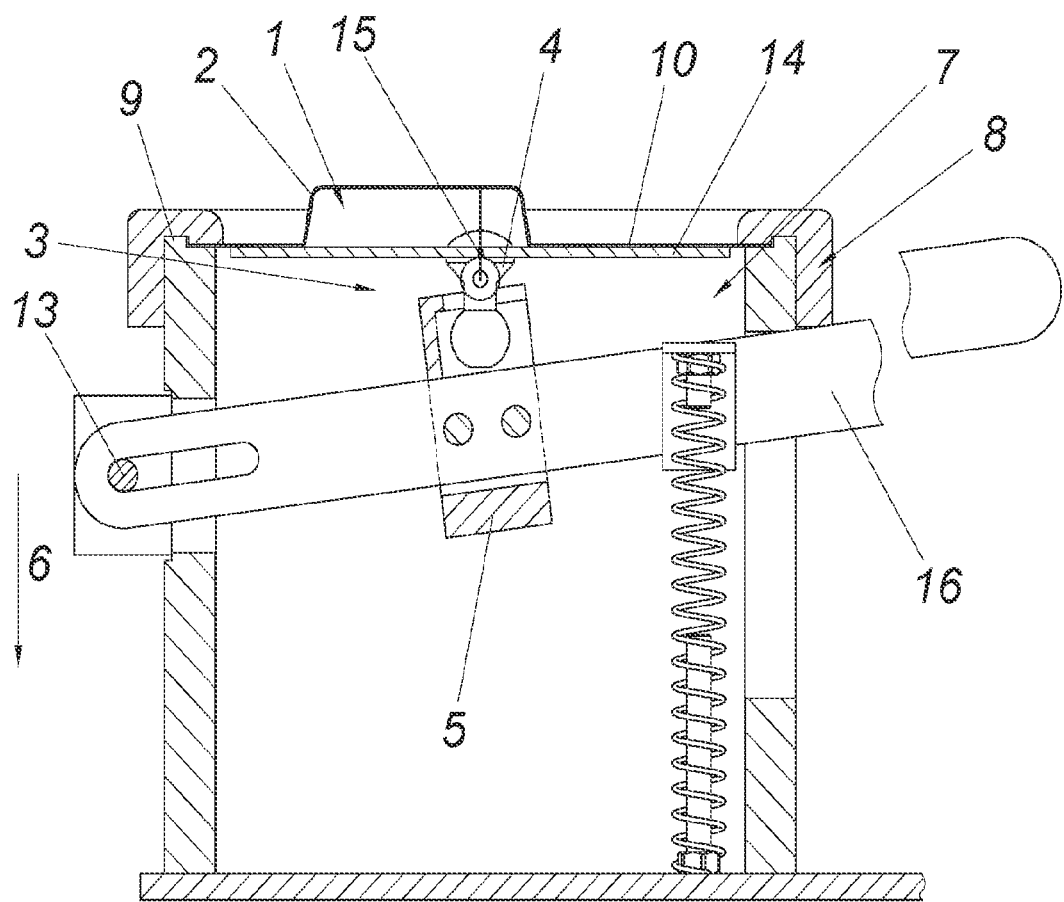

In the drawing, the subject matter of the invention is shown by way of example, wherein:

FIG. 1 shows a schematic section through an embodiment of the device according to the invention and a deep drawing model together with deep drawing film and pulling means, FIG. 2 shows a section corresponding to FIG. 1 in the engagement position, FIG. 3 shows a section corresponding to FIG. 2 in the removal position, and FIG. 4 shows a section through a further embodiment of the device according to the invention with stylized deep drawing model including deep drawing film.

DETAILED DESCRIPTION OF THE PREFERRED EMBODIMENTS

In a method according to the invention for separating a dental deep drawing model 1 from a deep drawing film 2 forming a dental splint, a pulling means 3 is first arranged between the deep drawing model 1 and the deep drawing film 2. If the pulling means 3 is arranged on the deep drawing model 1 before deep drawing and only then the deep drawing film 2 is pulled over the deep drawing model 1, the deep drawing film 2 partially encloses the pulling means 3 so that further fastening means can be dispensed with. Alternatively or additionally, the pulling means 3 can be knotted on the deep drawing model 1, for example. The pulling means 3 forms a stop 4 in which a puller 5 can engage. This puller 5 is displaceable from an engagement position shown in FIG. 2, in which the puller 5 engages in the stop 4 of the pulling means 3 without exerting pulling force on the deep drawing model 1, to a removal position in which deep drawing model 1 and deep drawing film 2 have been separated, which is shown in FIG. 3.

During the displacement from the engagement position to the removal position, the puller 5 applies a pulling force via the stop 4 of the pulling means 3 to release the deep drawing model 1 from the deep drawing film 2 and pulls the deep drawing model 1 out of the deep drawing film 2 in the pull-through direction 6. It should be noted that the pull-through direction 6 does not have to coincide exactly with the direction of the force vector of the force applied to the deep drawing model 1 by the puller 5 via the stop 4 in order to pull the deep drawing model 1 out of the deep drawing film 2, but can vary depending on the effective direction and arrangement of the puller 5. The only important aspect is that the applied force component in the pull-through direction 6 is large enough to release the deep drawing model 1 from the deep drawing film 2. As soon as the deep drawing model 1 detaches from the deep drawing film 2 due to the applied pulling force, the deep drawing model 1 falls through the removal opening 7 of a separation platform 8. Since the edge 9 of the removal opening 7 of the separation platform 8 forms a stop limit for the free deep drawing edge 10 of the deep drawing film 2, the deep drawing film 2 is not pulled along, but continues to rest on the edge 9. Separation is facilitated if the edge 9 of the removal opening 7 is frusto-conical. As a result, when the pulling force is applied to the deep drawing model 1, the deep drawing film 2 is drawn into the free space created by the truncated cone and reversibly expanded laterally, i.e. parallel to the removal opening 7, making it easier to detach the deep drawing model 1 from the deep drawing film 2.

The separation of the deep drawing model 1 from the deep drawing film 2 can be optimized by a number of further steps and the quality of the dental splint produced from the deep drawing film 2 can be improved. For example, at least one section of the pulling means 3 can be arranged in the region of the end sections 11 of the deep drawing model 1 in order to apply the pulling force via the end sections 11, which act as levers with a point of application in the region 12 of the incisors of the deep drawing model 1. As shown in FIGS. 1 to 3, at least one section of the pulling means 3 may extend between two teeth of the deep drawing model 1 so that the pulling means 3 does not affect the contour of the deep drawing film 2. For the same purpose, the pulling means 3 comprise a dimensionally unstable tape whose cross-sectional area between deep drawing model 1 and deep drawing film 2 is as small as possible.

To apply the pulling force, the puller 5 can be mounted on an axis of rotation 13 extending parallel to the removal opening 7. This has the advantage that the user only has to move the puller in one direction to bring the puller 5 into both the engagement and removal positions. In addition, the rotational movement facilitates the engagement of the puller 5 with the stop 4 of the pulling means 3. In order to prevent the deep drawing model 1 from falling onto the puller 5 after separation and to facilitate removal, a bearing platform 14 having at least one aperture 15 for a tape can be provided between the puller 5 and the removal opening 7. The tape is guided through the passage opening 15, the diameter of which is smaller than the largest width of the deep drawing model 1, but sufficiently large for the tape to be passed through it and be accessible to the puller 5.

FIG. 4 shows a further embodiment of the device according to the invention, in which the puller 5 applies the pulling force in the pulling direction 6 via the bearing platform 14. The deep drawing model 1 together with the deep drawing film 2 is arranged on the bearing platform 14, both ends of the tape are guided through different apertures 15 in the bearing platform 14 and either directly knotted or indirectly fastened to each other on the side facing away from the deep drawing model 1 in order to enclose the region of the bearing platform 14 between the openings 15 in an annular shape. The puller 5 thereby engages the bearing platform 14 and pulls it downward until the bearing platform 14 tensions the tape. Further displacement of the puller 5 into the removal position causes a pulling force in the pulling direction 6, which releases the deep drawing model 1 from the deep drawing film 2. For easier establishment of the engagement position, the lever 16 can have an elongated hole in which the axis of rotation 13 engages. This makes it easier to displace the puller 5 in the radial direction and engage it with the stop 4.

The invention claimed is:

1. A method for separating a dental deep drawing model from a deep drawing film, said method comprising:
    arranging at least one pulling apparatus on the deep drawing model, wherein the pulling apparatus extends at least in sections between the deep drawing model and the deep drawing film and comprises a stop on the deep drawing model,
    positioning the deep drawing model along with the deep drawing film over a removal opening, wherein an edge of the removal opening forms a stop limit for a free deep drawing edge of the deep drawing film, and then
    bringing a movable puller into an engagement position in which the movable puller engages the stop of the pulling apparatus and moving the movable puller beyond the engagement position into a removal position; and
    pulling the deep drawing model out of the deep drawing film through the removal opening.

2. The method according to claim 1, wherein at least one section of the pulling apparatus is arranged on the dental deep drawing model before deep drawing of the deep drawing film.

3. The method according to claim 1, wherein at least one section of the pulling apparatus is arranged in a region of two end sections of the deep drawing model.

4. The method according to claim 1, wherein at least one section of the pulling apparatus is arranged between two teeth of the deep drawing model.

5. The method according to claim 1, wherein the pulling apparatus comprises a tape that is dimensionally unstable in cross-section.

6. A device for separating a dental deep drawing model from a deep drawing film, said device comprising:
    a separation platform that has a removal opening with an edge that forms a stop limit for a free deep drawing edge of the deep drawing film and
    a puller arranged on a side of the separation platform facing away from the stop limit and displaceable from an engagement position into a removal position, the puller being configured so as to engage in a stop formed by a pulling apparatus arranged on the deep drawing model.

7. The device according to claim 6, wherein the puller is mounted on an axis of rotation extending parallel to a plane defined by the removal opening.

8. The device according to claim 6, wherein the edge of the removal opening is frustoconical on a side of the stop limit.

9. The device according to claim 7, wherein the puller is attached to a lever that is supported for movement about the axis of rotation.

10. The device according to claim 6, wherein the removal opening forms a receptacle for a bearing platform located downstream of the puller in a pulling direction, the platform having at least one aperture for a tape.

11. The device according to claim 7, wherein the edge of the removal opening is frustoconical on a side of the stop limit.

12. The device according to claim 8, wherein the puller is attached to a lever that is supported for movement about the axis of rotation.

13. The device according to claim 11, wherein the puller is attached to a lever that is supported for movement about the axis of rotation.

14. The device according to claim 7, wherein the removal opening forms a receptacle for a bearing platform located downstream of the puller in a pulling direction, the platform having at least one aperture for a tape.

15. The device according to claim 8, wherein the removal opening forms a receptacle for a bearing platform located downstream of the puller in a pulling direction, the platform having at least one aperture for a tape.

16. The method according to claim 2, wherein at least one section of the pulling apparatus is arranged in a region of two end sections of the deep drawing model.

17. The method according to claim 2, wherein at least one section of the pulling apparatus is arranged between two teeth of the deep drawing model.

18. The method according to claim 16, wherein the pulling apparatus comprises a tape that is dimensionally unstable in cross-section.

19. The method according to claim 17, wherein the pulling apparatus comprises a tape that is dimensionally unstable in cross-section.

20. The method according to claim 3, wherein at least one section of the pulling apparatus is arranged between two teeth of the deep drawing model.

* * * * *